United States Patent [19]

Dinse

[11] Patent Number: 4,681,202

[45] Date of Patent: Jul. 21, 1987

[54] APPARATUS FOR THE SAFETY STOPPAGE OF MECHANICALLY MOVED TOOLS, PARTICULARLY AUTOMATIC WELDING GUNS

[76] Inventor: Wilhelm Dinse, Königsreihe 12, D-2000 Hamburg 70, Fed. Rep. of Germany

[21] Appl. No.: 869,886

[22] Filed: Jun. 3, 1986

[30] Foreign Application Priority Data

Jun. 7, 1985 [DE] Fed. Rep. of Germany ....... 3520562

[51] Int. Cl.$^4$ ................................................ F16D 3/06
[52] U.S. Cl. .................................. 192/129 A; 74/527; 200/61.42; 901/42
[58] Field of Search ....................... 74/527; 901/13, 42, 901/46; 192/129 A; 200/61.42, 61.44

[56] References Cited

U.S. PATENT DOCUMENTS

| | | | |
|---|---|---|---|
| 2,658,967 | 11/1953 | Mutschke | 200/61.44 X |
| 3,309,940 | 3/1967 | Rosl | 74/527 |
| 4,514,616 | 4/1985 | Warner | 901/42 |

Primary Examiner—Dave W. Arola
Attorney, Agent, or Firm—Staas & Halsey

[57] ABSTRACT

A safety stoppage or disconnection apparatus for mechanically moved tools, particularly automatic welding guns, having a swashplate and an assembly casing, between which are arranged one or more spring elements and a switch operated by the relative movement between the swashplate and assembly casing. It is necessary with such safety apparatuses to prevent other adverse rotary movement between the swashplate and assembly casing. This is brought about by two facing bolts, whose heads projecting beyond the outer wall of the swashplate are guided in slots, which run in the inner wall of the assembly casing in the intended swashplate movement direction. The bolts are spring-loaded and preferably spherical. The bolts with the spherical heads on the one hand reliably prevent a rotary movement between the swashplate and assembly casing and on the other hand do not prevent the relative movement and a slowing down movement necessary for the operation of the switch, even if the swashplate is tilted and tipped by the relatively large moment exerted by the tool against the swashplate. Following tool relief, the swashplate returns in an unimpeded manner to its initial position.

6 Claims, 3 Drawing Figures

APPARATUS FOR THE SAFETY STOPPAGE OF MECHANICALLY MOVED TOOLS, PARTICULARLY AUTOMATIC WELDING GUNS

BACKGROUND OF THE INVENTION

The present invention relates to a safety stoppage apparatus for mechanically moved tools, particularly automatic welding guns.

Such apparatuses, which can be used for the most varied purposes, are known in numerous different forms. Apparatuses for the safety stoppage of mechanically moved tools are known in connection with the provision of welding guns on automatic welding machines, e.g. on so-called robot arms. These apparatuses must be constructed in such a way that the swashplate, which preferably carries the tool, namely the welding gun and the assembly plate, which is fixed to the corresponding machine tool, is movable to all sides in an unimpeded manner and solely under the tension of springs. Further, this movement showed ensure a safe and reliable operation of the switch and consequently to an interruption of the work of the corresponding machine tool. In order to avoid damage or destruction, the switch must operate rapidly and easily, it being necessary to continue the swashplate movement following the switching process in the sense of a slowing down or lag.

During this movement between the swashplate and the assembly casing, there must be no rotary movement, i.e. the two parts must be prevented from rotating.

SUMMARY OF THE INVENTION

One of the primary objectives of the invention is to prevent rotary movement between a swashplate and assembly casing in a safety stoppage apparatus such that the desired relative movement for actuation of the switching mechanism is not impeded by the rotational movement of the swashplate.

It is a further objective of the invention to insure that the relative switching mechanism movement takes place in an unimpeded and easy manner over the entire stroke range even if the movement between the assembly casing and the swashplate does not take place precisely in the axial or longitudinal direction but instead takes place in a tilting manner.

To achieve the objects of the invention and to overcome the problems in the prior art, the invention is directed to an apparatus for the safety stoppage of a mechanically moved tool comprising: (a) an assembly casing having longitudinal and transverse axes and inner walls, the inner side walls having a longitudinal slot formed therein; (b) a swashplate having a first swashplate portion positioned in the longitudinal direction within the inner walls of the assembly casing, the first swashplate portion having spherical side walls facing the inner side walls of said assembly casing, and a second swashplate portion extending from the first swashplate portion outside the assembly casing and operatively connectable to the mechanically moved tool; (c) a spring element positioned between said swashplate and inner wall of said assembly casing for biasing said swashplate and assembly casing apart in the longitudinal direction; (d) a switch operated by relative longitudinal movement between the swashplate and the assembly casing; and (e) a spring-loaded bolt positioned in a transverse direction in the first swashplate portion and extending from the spherical side wall of said first swashplate portion, said bolt having a head positioned in said longitudinal slot of said assembly casing inner side wall for longitudinal movement therein upon longitudinal movement of said swashplate relative to said assembly casing.

Due to the fact that one or more spring-loaded bolts are provided, which can consequently give way with respect to the bias of the springs and whose heads aare preferably spherical, the relative and desired movement between the swashplate and assembly casing can take place in an unimpeded manner, even if the swashplate is tilted, i.e. if it is asymmetrically loaded and consequently is not moved in the axial direction. As the tool, which is preferably fixed to the swashplate, exerts a large moment on the swashplate when striking an obstacle, the swashplate is in most cases not moved axially and is instead tilted. However, the special construction and arrangement of the bolts permit an easy, umimpeded movement within the range of the stroke allowed by the dimensions of the swashplate and the assembly casing.

Advantageously the apparatus is constructed wherein at least two bolts are provided in the swashplate first portion opposite one another and four springs are provided between the swashplate and the assembly casing. In particular, the arrangement of two facing bolts (the angle between them being 180°) permits a rotation-preventing mounting, but which still permits an unimpeded movement of the swashplate in the switching or operating direction.

BRIEF DESCRIPTION OF THE DRAWINGS

The invention is described in greater detail hereinafter relative to a non-limitative embodiment and with reference to the attached drawings, wherein.

DETAILED DESCRIPTION OF THE PREFERRED EMBODIMENT

Figure 1:
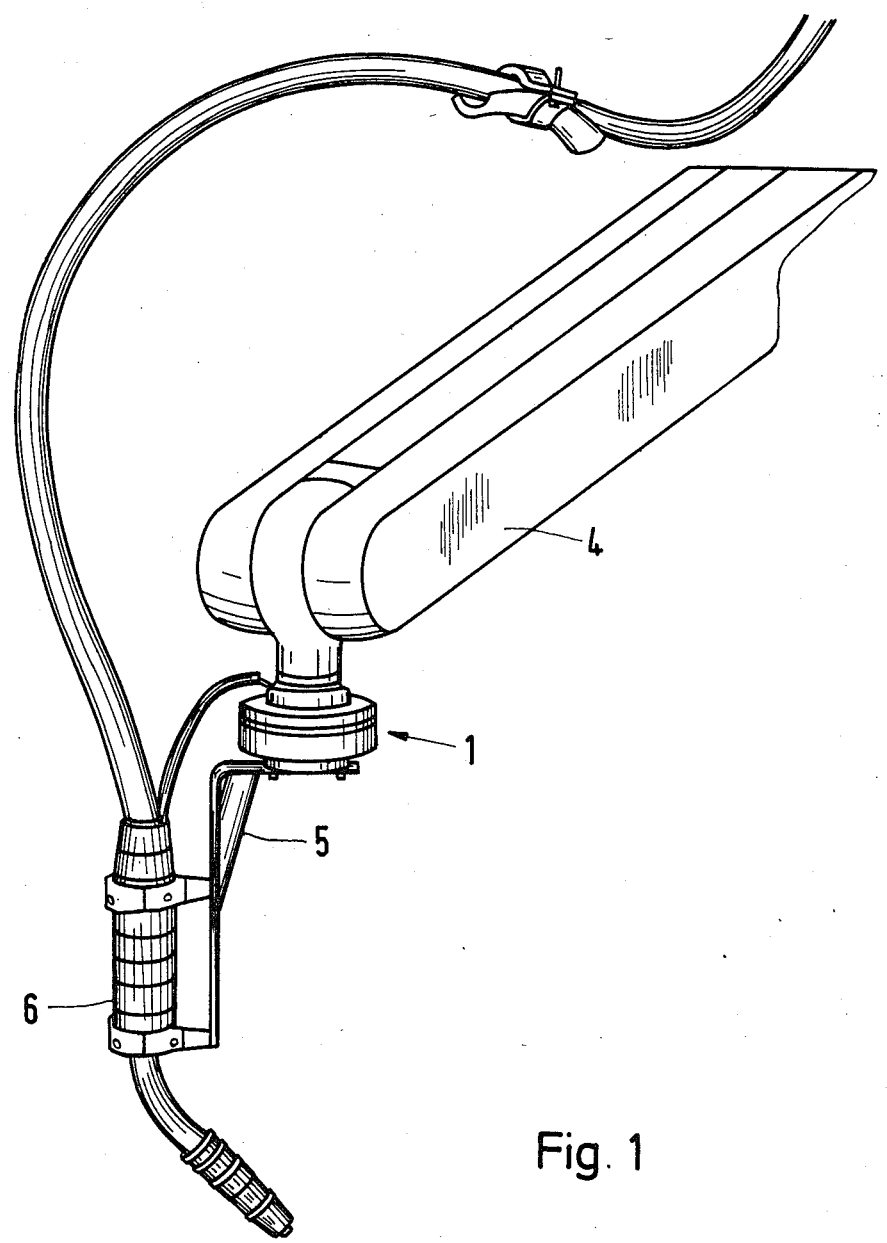
FIG. 1 is a perspective view of a welding means with a safety stoppage apparatus according to the invention.

The welding means shown in FIG. 1 of the drawings comprises an arm 4, a so-called robot arm on the machine tool. The safety stoppage or disconnection apparatus is fixed to one end of this arm and is given the general reference numeral 1. A welding gun 6 is fixed to apparatus 1 by a clip 5.

Figure 2:
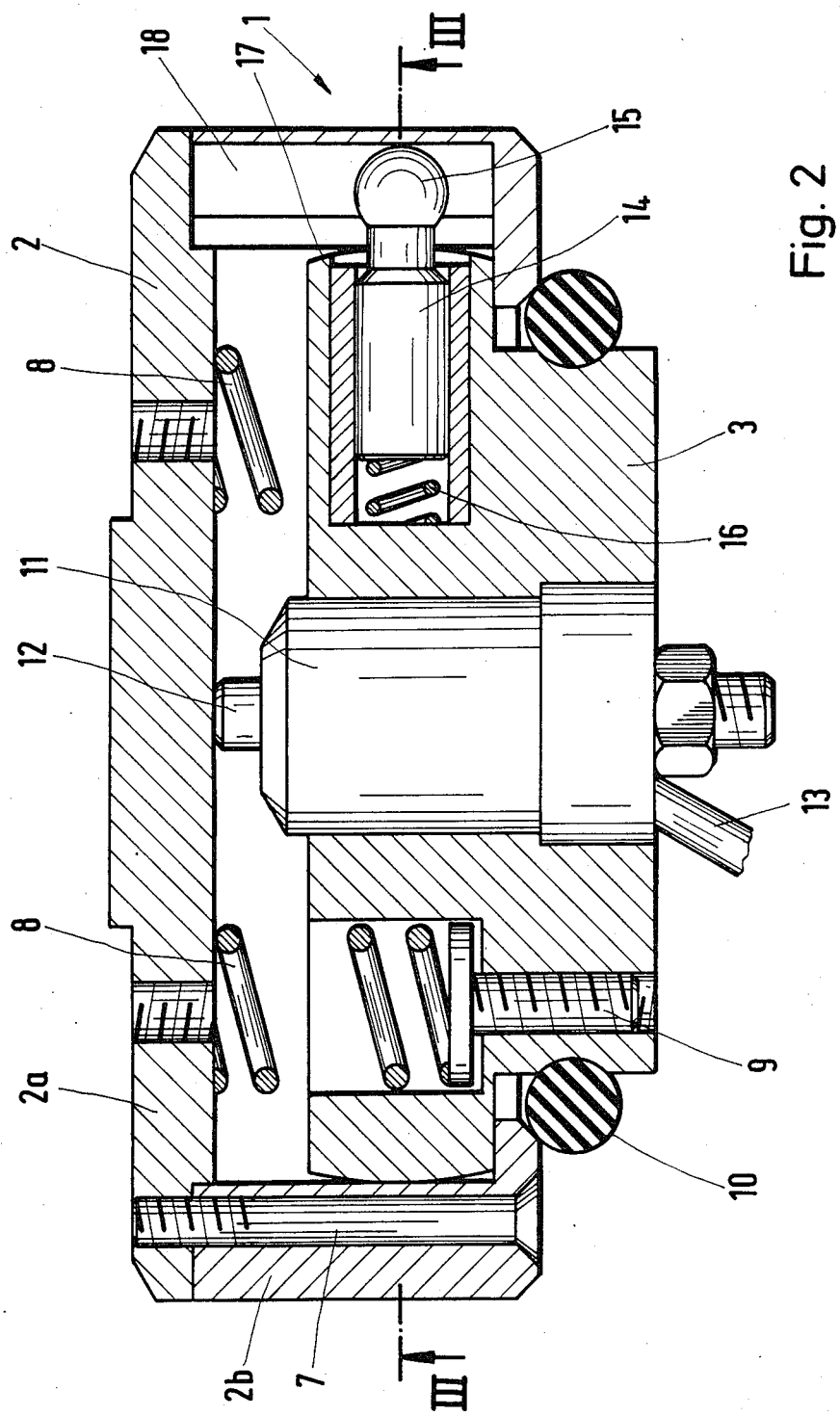
FIG. 2 is a longitudinal sectional view of the safety stoppage apparatus, shown in the embodiment according to FIG. 1.
Figure 3:
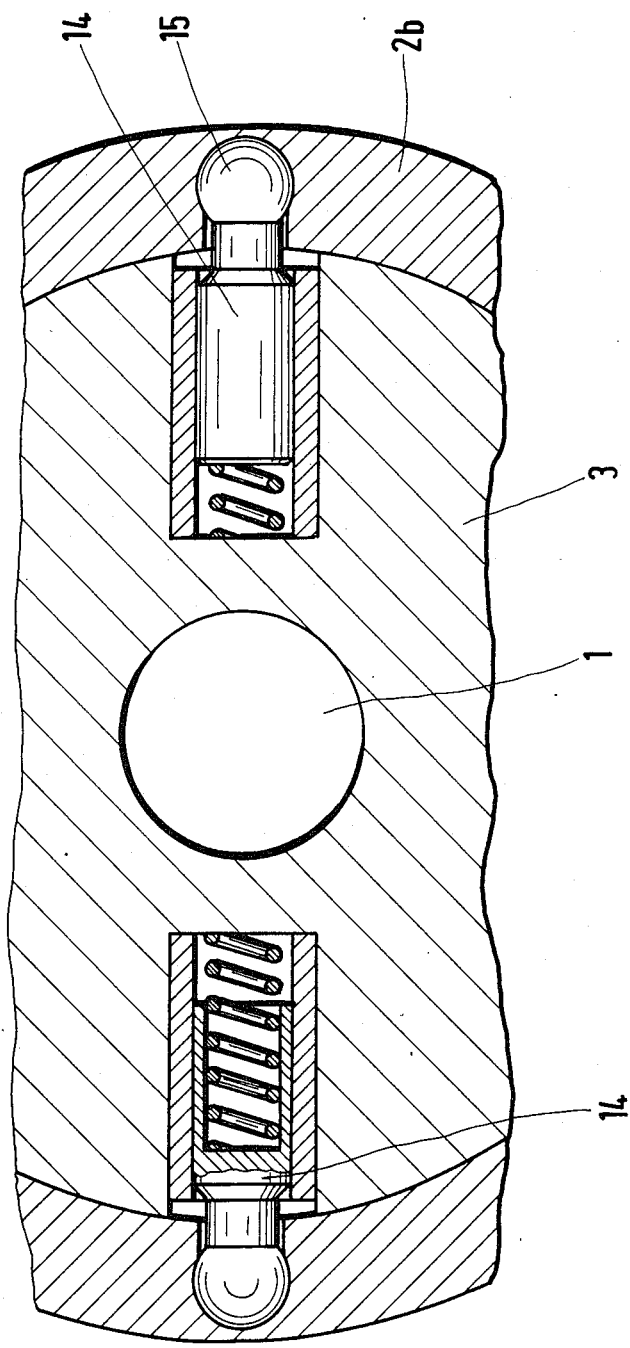
FIG. 3 is a sectional view of the safety stoppage apparatus taken along line III—III of FIG. 2.

FIGS. 2 and 3 show the apparatus 1 in detail. It comprises an assembly casing 2, which in turn is formed from an assembly plate 2a and a ring 2b. These two parts 2a, 2b are fixed to one another by screws 7.

A swashplate 3 having a spherical outer wall 17 is mounted in the assembly casing 2 formed from parts 2a, 2b. There are four compression springs 8, located between swashplate 3 and plate 2a of the assembly casing 2, and having a spring force urging the swashplate 3 and plate 2a of assembly casing 2 apart. In principle, one or more other spring elements can be used. Springs 8 are adjustable by screws 9. A gasket ring 10 protects the inner area formed by swashplate 3 and assembly casing 2.

A switch 11 with a switch element 12 is fixed in swashplate 3 and there is provided an electric cable 13 leading to switch 11.

In the vicinity of the outer wall 17 of swashplate 3 are mounted two bolts 14, which are biased by springs 16. Bolts 14 have spherical heads 15 projecting from the outer circumference of swashplate 3. These spherical heads 15 are guided in slots 18, which are formed in assembly casing part 2b and run in the direction of the intended relative movement between the two parts 2 and 3.

If, during operation, welding gun 6 comes up against an obstacle, the corresponding force produces a moment acting on swashplate 3. This movement moves the swashplate 3 on the corresponding outer edge in the direction of assembly plate 2a of assembly casing 2, leading to a compression of the corresponding spring 8. Corresponding to the setting of switch element 12 of switch 11, the latter is relatively sensitively and rapdily operated. The movement of swashplate 3 can continue following the switching process. The engagement of spherical heads 15 in slots 18 prevents a rotation between swashplate 3 and assembly casing 2. Due to the configuration of slots 18 and the spherical construction of heads 15, the desired relative movement between the two parts 2, 3 initiating the switching process and ensuring a certain lag, is not impeded. This is true even, if as a result of the moment exerted by gun 6 against swashplate 3, the swashplate 3 tips and tilts. No matter how unfavourable the resulting stressing or loading, the switching process is reliably initiated, the slowing down process can take place in an unimpeded manner and swashplate 3 can, after relief, return to its initial position.

The safety stopping apparatus has been described in connection with a welding machine. However, it is clear that this apparatus can also be used in conjunction with other, mechanically moved tools. This more particularly applies to all applications in which the corresponding tool produces a relatively large moment on the swashplate and non-uniformly loads it in the safety case, leading to tipping and tilting.

What is claimed is:

1. An apparatus for safety stoppage of a mechanically moved tool, comprising:

(a) an assembly casing having longitudinal and transverse axes and inner walls said inner walls including first and second transverse walls and a longitudinal wall therebetween the longitudinal inner wall having a longitudinal slot formed therein;

(b) a swashplate having a first swashplate portion positioned in the longitudinal direction within the inner walls of the assembly casing, the first swashplate portion having spherical side walls facing the longitudinal inner wall of said assembly casing, and a second swashplate portion extending from the first swashplate portion outside the assembly casing and operatively connectable to the mechanically moved tool;

(c) a spring element positioned between said swashplate and first transverse inner wall of said assembly casing for biasing said swashplate and assembly casing apart in the longitudinal direction; with said swashplate and second transverse wall adapted to abut to prevent longitudinal sepatation of said swashplate and assembly casing (d) a switch operated by relative longitudinal movement between the swashplate and the assembly casing; and (e) a spring-loaded bolt positioned in a transverse direction in the first swashplate portion and extending from the spherical side wall of said first swashplate portion, said bolt having a head positioned in said longitudinal slot of said assembly casing inner side wall for longitudinal movement therein upon longitudinal movement of said swashplate relative to said assembly casing.

2. The apparatus of claim 1, wherein the head of said bolt is spherical.

3. The apparatus of claim 1, wherein at least two bolts are provided in the swashplate first portion opposite one another.

4. The apparatus of claim 3 wherein the heads of said bolts are spherical.

5. The apparatus of claim 4, wherein at least two springs are provided between said swashplate and said assembly casing.

6. The apparatus of claim 5, wherein the spring load of said springs between said swashplate and assembly casing is selectively adjustable.

* * * * *